United States Patent Office 3,580,791
Patented May 25, 1971

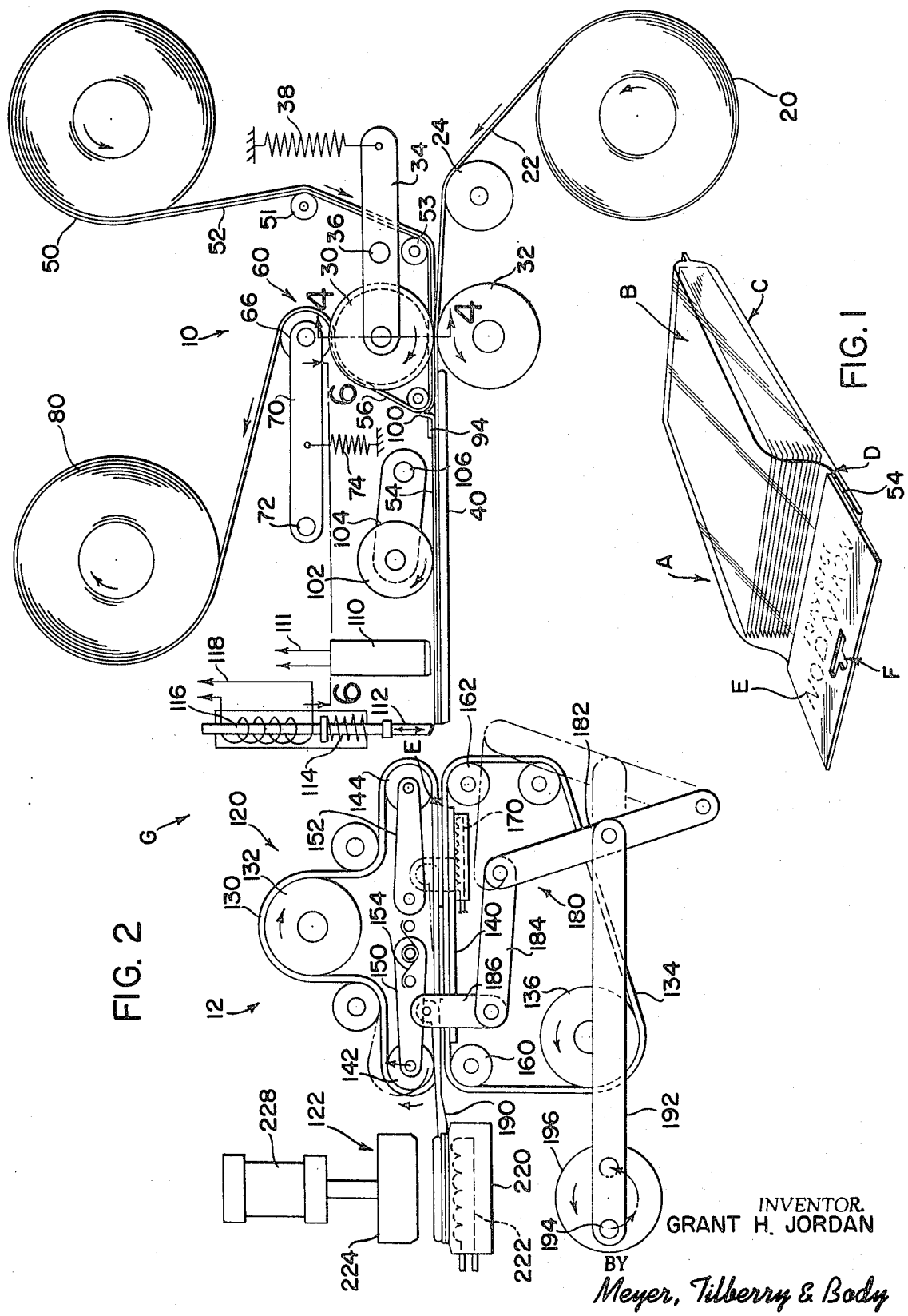

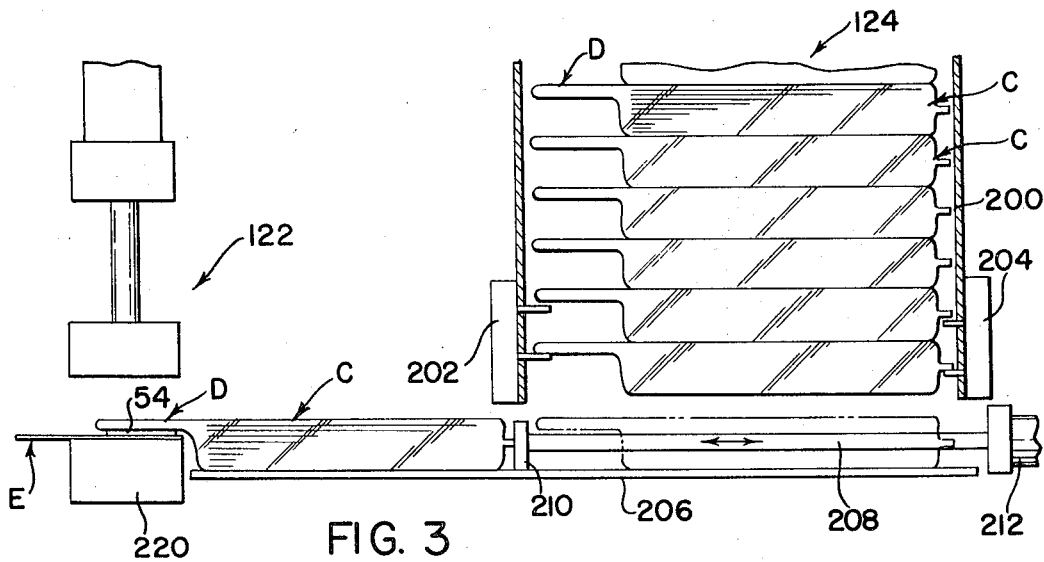
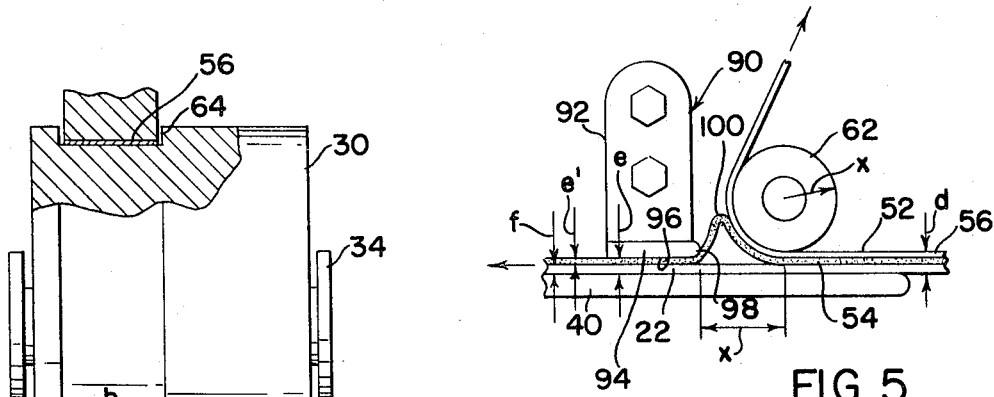
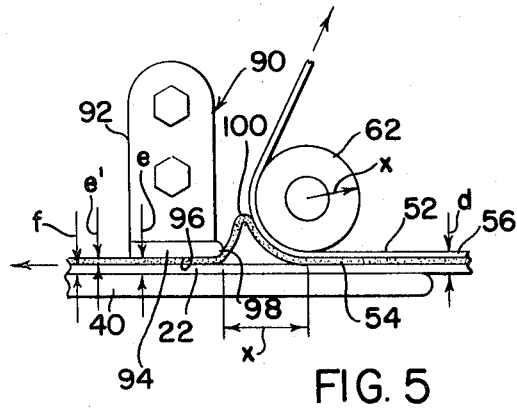
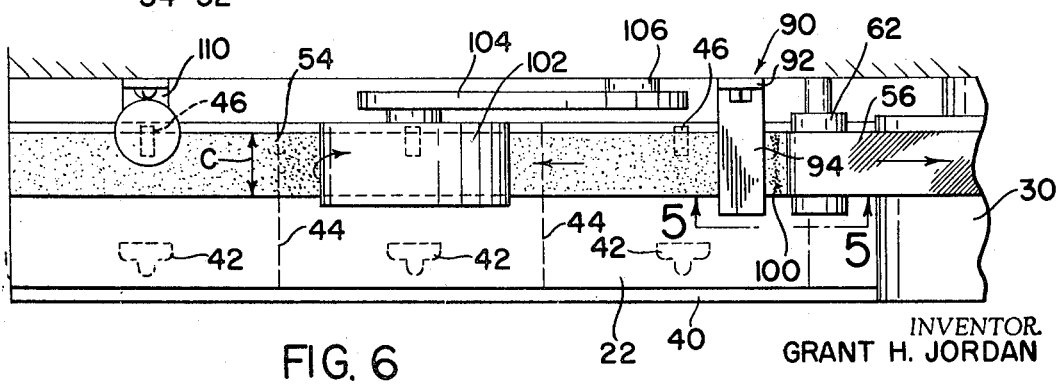

3,580,791
DEVICE FOR APPLYING A BAND OF THERMO-SETTING MATERIAL ONTO A LABEL AND FOR SEALING THE LABEL ONTO AN ARTICLE
Grant H. Jordan, Parma, Ohio, assignor to American Greetings Corporation, Cleveland, Ohio
Filed June 19, 1968, Ser. No. 738,173
Int. Cl. C32b 31/00
U.S. Cl. 156—540
20 Claims

ABSTRACT OF THE DISCLOSURE

There is provided a device for producing a label with a band of thermosetting material on one side thereof for subsequent heat sealing of said label onto an article. This device comprises a means for moving a strip of label stock and an adhesive strip having a thermosetting layer and a backing strip along a feedline with the thermosetting layer adhered to said strip of label stock. A parting member pulls the backing strip from the adhesive strip while a stripper member prevents the backing strip from pulling the thermosetting layer from the label stock, and a cutting means cuts the label stock into separate labels. There is provided a further device for then heat sealing the label onto a package formed from thin plastic film material.

---

This invention pertains to the art of applying labels onto an article and more particularly to a device for applying a band of thermosetting material onto a label before the label is heat sealed onto an article, as well as a device for sealing the label onto a package or article.

The invention is particularly applicable for applying a label onto the end of a plastic film package for cards and similar items, and it will be described with particular reference thereto; however, it should be appreciated that the invention has much broader applications and may be used for applying a label onto various articles or packages.

Considerable effort has been devoted to the development of economical packaging methods for cards and similar flat items. These developments have generally resulted in adopting some type of plastic package for cards, and these packages are often displayed on a rack having a plurality of outwardly extending support rods which protrude through holes in the package to support the same in a manner convenient for display purposes. Since the plastic forming the package is a relatively thin film and does not have sufficient strength to support the package on a rod, various modifications have been developed for reinforcing the package to allow the package to hang for a prolonged time on the display rod. One of these arrangements includes providing an elongated support card having a hole in one end with the package being adhered to the lower portion of the support card. This arrangement was somewhat expensive; therefore, it was proposed to provide an apertured label which could be adhered to the upper tab of a plastic film package containing greeting cards and similar items. The adhesive used to glue or adhere the label onto the package was pressure sensitive; therefore, during prolonged hanging on the rod, especially when ambient temperatures were relatively high, failure of the adhesive bond between the label and the package containing the cards was often experienced. Consequently, although this method was relatively inexpensive, it was not satisfactory for the purposes intended.

The present invention is directed toward an apparatus which will provide an adhesive label that can be secured onto one end of a plastic package containing cards and which will not fail during prolonged hanging of the package by the label onto a display rod.

In accordance with the present invention there is provided a device for producing a label with a band of thermosetting adhesive material on one side thereof for subsequent heat sealing of the label onto an article. This device comprises means for moving, at a preselected speed and along a feedline, a strip of label stock onto which is adhered an adhesive strip including a thermosetting layer adhered to said strip of label stock and a releasable backing strip on the side of the adhesive strip opposite to the label stock; means for pulling the backing strip from the adhesive layer at a speed approximately equal to the afore-mentioned preselected speed; means for maintaining the layer with the strip of label stock as it moves along the feedline; and, means for cutting individual labels from the strip of label stock.

A label produced by the device defined above can be adhered onto an article, such as a plastic film package for cards, by heat sealing the thermosetting band or layer onto both the package and the label stock. A thermosetting seal between a plastic film package and a hanging label at one end of the package has not been accomplished because of the difficulties in automating the application of the thermosetting material.

In accordance with another aspect of the present invention, there is provided a hanging display package comprising a plastic film container having an upper flat portion, a label having an aperture at one end and a mounting portion at the opposite end and a thermosetting layer between the flat portion and the mounting portion, this layer forming an adhesive bond with both of these portions.

It has been found that a package constructed in accordance with the invention, as defined above, provides a superior joint between the label and the plastic film package so that there is a minimum of separation while the package is supported by a rod extending through the aperture on the label.

The primary object of the present invention is the provision of a device for producing a label having a thermosetting layer thereon, which device automatically applies the layer onto the label in a uniform manner with a minimum of maintenance.

Another object of the present invention is the provision of a method for producing a package having a plastic film container and label hanger secured thereto, which method is economical to follow and results in a uniform, structurally strong joint between the label and the container.

Another object of the present invention is the provision of a display package having a thermosetting seal between a label and and a plastic film container, whereby the package may be suspended by the label without failure of the seal between the label and the container.

These and other objects and advantages will become apparent from the following description used to illustrate the preferred embodiment of the present invention as described in connection with the accompanying drawings in which:

FIG. 1 is a pictorial view of a package produced in accordance with the present invention;

FIG. 2 is a schematic illustration of the preferred embodiment of the present invention;

FIG. 3 is an enlarged cross-sectional view illustrating a further aspect of the apparatus, as disclosed in FIG. 2;

FIG. 4 is an enlarged cross-sectional view taken generally along line 4—4 of FIG. 2;

FIG. 5 is an enlarged cross-sectional view taken generally along line 5—5 of FIG. 6; and, FIG. 6 is an enlarged cross-sectional view taken generally along line 6—6 of FIG. 2.

Referring now to the drawings, wherein the showings are for the purpose of illustrating a preferred embodiment of the invention, and not for the purpose of limiting same, FIG. 1 illustrates a hanging display package A for encapsulating and displaying a plurality of separate cards or elements B. Package A includes a plastic film container C having, at one end thereof, a flat portion D onto which is secured a label E formed from cardboard, or a similar material. An aperture F within the label E is used to hang the package onto an appropriate display rod. In accordance with the invention, there is provided a device G for applying the label E onto the container C. This device, best shown in FIG. 2, includes, as major components, a label preparing mechanism 10 and a label applying mechanism 12.

Referring now more particularly to the label preparing mechanism 10, which forms the primary aspect of the present invention, there is provided an idling supply reel 20 of label stock 22 in the form of an elongated strip. This strip extends over a guide roller 24 and through feeding pinch rolls 30, 32, the first being driven by the second. Roll 30 is supported on a lever 34 pivotally mounted about pin 36 and biased in a downward direction by spring 38. In this manner, the strip 22 is fed along a flat support 40 to be acted upon in accordance with the further elements included within mechanism 10. Referring to FIG. 6, the label stock 22 includes a plurality of equally spaced perforations 42 which form a portion that may be removed to define an aperture F. Lines 44 generally denote the division between separate and distinct labels on the strip of label stock 22. In practice, these lines do not actually exist and their use in FIG. 6 is only to define and illustrate the repetitive nature of the labels printed upon strip 22. The strip also includes equally spaced dark indicating marks 46 which are appropriately registered with respect to the line 44. These indicating marks are utilized to sever the label stock 22 along lines 44 to define separate and distinct labels, in a manner to be described later.

Referring again to FIG. 2, an idling supply reel 50 is used to supply an adhesive strip 52 which is a thermosetting tape sold under the trademark Scotch-Weld Bonding Tape No. 583 marketed by Minnesota Mining and Manufacturing Company and, in practice, having a width of ⅜ inch. The exact composition of this particular tape is not known; however, its properties are well known to persons skilled in the art of applying thermosetting adhesive tape onto a flat member. In the past, this tape has not been used for the purpose described in this application nor has any fully automatic mechanism been used to apply the tape, as illustrated and taught herein. Of course, other tapes having the same general characteristic could be used in practicing the present invention. The adhesive tape 52 is guided around rollers 51, 53 and includes a thermosetting layer 54 and a releasable backing strip 56. The backing strip prevents cohesion between separate convolutions of layer 54 during manufacture of the tape and during storage. Of course, the layer 54 must be heated to a temperature generally known as the "curing temperature" before a permanent bond is provided between this layer and abuttinge elements.

After the tape 52 is brought into contact with strip 22, it is necessary to remove the releasable backing strip 56. This operation is done by a novel mechanism 60 for removing or pulling strip 56 from strip 52. This mechanism includes a parting element 62 in the form of a roller having a radius $x$, as shown in FIG. 5. As shown in FIG. 4, the pinch roll 30 includes a recess 64 having a depth $a$ and a width $b$. The strip 52 has combined width $c$ and a thickness $d$. As shown, the depth $a$ is slightly greater than the thickness $d$ and the width $d$ is slightly greater than the width $c$. By providing these dimensions, the tape 52 passes beneath roll 30 without interference with the feeding action of roll 30 against the upper surface of strip 22. After strip 56 passes around parting roller 62, it is threaded back into the recess 64 adjacent the upper portion of roll 30. A pressure roller 66 is provided on a lever 70 having a pivot pin 72. A spring 74 biases the roller 66 against the strip 56 riding within recess 64. In this manner, the strip 56 is removed from strip 52 at a speed determined by the peripheral speed of roller 30, the recess dimensions being somewhat exaggerated. This correlates the withdrawal speed of the strip 56 with the linear speed of the label stock 22. A take-up reel 80 applies tension to the tape 56 for drawing the tape from roller 66.

As so far described, the thermosetting layer 54 will tend to be pulled away from the moving strip 22 since there has been very little pressure applied between the layer 54 and the upper surface of strip 22. To prevent the withdrawal of the thermosetting layer 54, there is provided a stripper member 90 including a support bracket 92 and a blade 94 extending over the layer 54. The lower surface 96 of blade 94 is spaced a distance $e$ from the upper surface of support 40. This distance $e$ is about equal to or slightly greater than the total summation of the thickness $e'$ of layer 54 and the thickness $f$ of strip 22. In this manner, the lower surface 96 forces the layer 52 downwardly into substantial contact with the upper surface of strip 22. Edge surface 98 of blade 94 is contoured to prevent any substantial drag on the movement of thermosetting layer 54 with the strip 22. Lower surface 96 and edge surface 98 are both provided with a non-stick material, such as Teflon, so that the tackiness of the layer 54 will not cause adhesion of this thermosetting layer with the stripper blade 94. By locating the edge surface 98 from the axis of roller 62 a distance generally equal to the radius $x$ of the roller, it has been found that quite satisfactory results can be obtained. A loop 100 is formed between edge 98 and the roller 62, which loop is formed because of the tendency of the layer 54 to move upwardly with the strip 56 as it is being withdrawn from the adhesive strip 52.

To force air from between the strip 22 and the thermosetting layer 54, a weighted, pressure roller 102 formed from a non-stick material is provided down stream of the stripper member 90. Roller 102 is mounted upon lever 104 which is, in turn, pivoted about pin 106. The weight of the roller against the layer 54 in effect secures the layer onto strip 22. This effect of the roller 102 permits the backing strip 56 to be separated from the layer 54 without pulling layer 54 from the label strip 22. This is an important feature of the present invention. This secures the layer 54 onto the label stock. In this manner, the strip and layer move in unison through the remainder of the apparatus G. The pulling action on the layer 54 causes the primary impetus for drawing the strip 52 from the reel 50; however, this does not negate further motivating power.

To cut the strip 22 along lines 44, there is provided a photosensing cell 110 having signal output lines 111. This cell detects the presence of indicating marks 46 and actuates cutoff device 112 at the proper time to sever the strip 22 at the lines 44. The cutoff device includes a return spring 114 and a solenoid 116. When a control signal is received through control lines 118 in response to a signal through lines 111 of the photo-sensing cell 110, the solenoid 116 is actuated to sever strip 22. This provides a label E having a layer 54 held in place on one surface of the label but not yet cured to its final fixed physical characteristics. Because of the short length and light weight of the layer 54, it remains with the separate severed label E as this label is fed into the label applying mechanism 12, best shown in FIG. 2.

Referring now in more detail to the label applying mechanism, it includes a conveyor 120, a heat sealing station 122 and a feeding device 124, best shown in FIG. 3. The conveyor 120 includes a belt 130 driven by wheel 132 and a belt 134 driven by wheel 136. The two wheels are rotated in opposite directions to drive the separate belts 130, 134 from right to left in FIG. 2. A support 140 below belt 134 primarily defines the space through which the label E is driven by the belts 130, 134. Spaced drive wheels 142, 144 are mounted on levers 150, 152, respectively. A spring 154 allows wheel 142 to move vertically away from the support 140, for holding the label E against belt 134. Guide wheels 160, 162 guide the belt 134 across the top of support 140 to combine with belt 130 for conveying the label E toward the heat sealing station 122. A preheating element 170 is positioned adjacent the support 140 so that the layer 54 is preheated to a temperature in the general range of 250° F.–300° F. In this manner, the layer 54 is raised to a temperature only slightly below its curing temperature (about 325° F. and in the range of 300° F.–350° F.) so that the subsequent heat sealing can be effected under pressure in a relatively short time.

After the label E is conveyed to the left hand portion of the belts 130, 134, a shuttle feeder moves the label into the heat sealing station 122. This shuttle feeder includes an oscillating lever 182 pivotally supported on one end of an intermediate lever 184 which is, in turn, joined to a connecting link 186. This link reciprocates a feeding finger 190. As the finger is moved backwardly, it moves over the next label E and contacts the right hand end of the next label E. Thereafter, the finger 190 is moved to the left by an operating lever 192 connected with an eccentric end 194 on a driven wheel 196. The finger 190 accurately positions the label E within the heat sealing station with the thermosetting layer 54 facing upwardly.

Referring now to the feeding device 124, shown in FIG.. 3, this device may take a variety of structural forms; however, in accordance with the illustrated embodiment, includes a magazine 200 having lower escapements 202 and 204. These escapments drop a plastic film container C onto a lower platform 206. A pusher rod 208 with a forward head 210 is actuated by a cylinder 212 so that a container C is forced to the left with the flat portion D overlying thermosetting layer 54. The label E is now ready to be heat sealed onto the flat portion D of the container C.

Referring now to FIGS. 2 and 3, the heating station 122 includes a fixed member 220 having a heating element 222. The heating element maintains the temperature of member 220 in the general range of 300° F.–350° F. i.e. the curing temperature for the particular tape contemplated for use in the present invention. A pressure member 224 is reciprocally mounted in a guide, not shown. After the label E and the container C are in place, an operating cylinder 228 brings the member 224 downwardly to exert pressure on the layer 54. This pressure, combined with the heat, cures the thermosetting material of layer 54 to provide a heat sealed bond between the portion D and the label E.

For the purposes of simplicity, the driving mechanisms, electrical controls, pneumatic controls and other details well within the ordinary skill of the art have been omitted from these drawings. These components do not form a part of the present invention and may take various forms as long as the function of the various mechanisms is accomplished in a manner as described above. In practice, the device G is indexed to produce a single label E at a time. Thus, after a label is produced it is fed into the heating station and heat sealed. Thereafter, or slightly before that, the mechanism 10 is recycled to produce another label E. Modifications in the general operating characteristics of this invention can be made without departing from the intended spirit and scope of the present invention as defined in the appended claims.

Having thus defined my invention, I claim:

1. A device for producing a label with a band of thermosetting adhesive material on one side thereof for subsequent heat sealing of said label onto an article, said device comprising:
   (a) means for moving a strip of label stock along a given feedline, said strip having an exposed mounting surface;
   (b) means for moving, along said feedline and over said mounting surface, an adhesive strip comprising a thermosetting layer having a first and second surface, said first surface facing and coextensive with said mounting surface, and a releasable backing strip over said second surface;
   (c) a parting member on the same side of said feedline as said releasable backing strip for parting said thermosetting layer from said backing strip;
   (d) means for continuously pulling said backing strip around said parting member and from said thermosetting layer as said strip is being moved;
   (e) means for pressing said thermosetting layer against said strip of label stock whereby said layer is secured to said stock; and
   (f) means for cutting said strip of label stock and said thermosetting layer at selected intervals to form labels wherein said thermosetting layer provides a heat sealable band on each of said labels.

2. A device as defined in claim 1 wherein said parting member is a roller rotatable about an axis generally transverse to said feedline and generally parallel to said mounting surface.

3. A device for producing a label with a band of thermosetting adhesive material on one side thereof for subsequent heat sealing of said label onto an article, said device comprising:
   (a) means for moving a strip of label stock along a given feedline, said strip having an exposed mounting surface;
   (b) means for moving, along said feedline and over said mounting surface, an adhesive strip comprising a thermosetting layer having a first and second surface, said first surface facing and coextensive with said mounting surface, and a releasable backing strip over said second surface;
   (c) a parting member on the same side of said feedline as said releasable backing strip;
   (d) means for pulling said backing strip around said member and from said thermosetting layer;
   (e) means for pressing said thermosetting layer against said strip of label stock whereby said layer is secured to said stock;
   (f) means for cutting said strip of label stock and said thermosetting layer at selected intervals to form labels wherein said thermosetting layer provides a heat sealable band on each of said labels; and,
   (g) a stripper member overlying said thermosetting layer and spaced only slightly from said parting member in the direction of movement of said strip of label stock, said thermosetting layer having a given thickness, and a given width, said stripper member being spaced from said mounting surface a distance at least slightly greater than said thickness and having a transverse width at least generally equal to said layer width.

4. A device for producing a label with a band of thermosetting adhesive material on one side thereof for subsequent heat sealing of said label onto an article, said device comprising:
   (a) means for moving a strip of label stock along a given feedline, said strip having an exposed mounting surface and said means for moving said strip of label stock including two pinch rolls with at least one of said pinch rolls being driven;
   (b) means for moving, along said feedline and over said mounting surface, an adhesive strip comprising a thermosetting layer having a first and second surface, said first surface facing and coextensive with said mounting surface, and a releasable backing strip over said second surface;
   (c) a parting member on the same side of said feedline as said releasable backing strip;
   (d) means for pulling said backing strip around said member and from said thermosetting layer;

(e) means for pressing said thermosetting layer against said strip of label stock whereby said layer is secured to said stock; and, (f) means for cutting said strip of label stock and said thermosetting layer at selected intervals to form labels wherein said thermosetting layer provides a heat sealable band on each of said labels.

5. A device as defined in claim 4 wherein one of said pinch rolls has a cylindrical surface bearing against said mounting surface, said adhesive strip having a selected width and thickness and said one pinch roll having a circumferentially extending recess aligned with said adhesive strip as said adhesive strip moves between said pinch rolls, said recess has a depth at least as great as said thickness and a width at least as great as said strip width.

6. A device s defined in claim 4 wherein one of said pinch rolls bears against said mounting surface at a first location on said one roll for moving said strip of label stock and said pulling means comprises a roller, means for forcing said roller against said one pinch roll at a second location on said one roll and means for guiding said backing strip between said one roll and said roller to pull said backing strip away from said layer at the general peripheral speed of said one roll.

7. A device as defined in claim 6 wherein said adhesive strip has a selected width and thickness and said one pinch roll has a circumferentially extending recess aligned with said adhesive strip as said adhesive strip moves betwene said pinch rolls, said recess having a depth at least as great as said thickness and a width at least as great as said strip width, and said roller being adapted to extend into said recess to press said backing strip against said one roll.

8. A device for producing a label with a band of thermosetting adhesive material on one side thereof for subsequent heat sealing of said label onto an article, said device comprising:
(a) means for moving a strip of label stock along a given feedline, said strip having an exposed mounting surface;
(b) means for moving, along said feedline and over said mounting surface, an adhesive strip comprising a thermosetting layer having a first and second surface, said first surface facing and coextensive with said mounting surface, and a releasable backing strip over said second surface;
(c) a parting member on the same side of said feedline as said releasable backing strip;
(d) means for pulling said backing strip around said member and from said thermosetting layer, said pulling means including a pair of driven rolls formin a nip spaced away from said feedline and from said parting member, means for guiding said backing strip through said nip and means for driving said driven rolls at a peripheral speed substantially the same as the linear speed of said strip of label stock;
(e) means for pressing said thermosetting layer against said strip of label stock whereby said layer is secured to said stock; and
(f) means for cutting said strip of label stock and said thermosetting layer at selected intervals to form labels wherein said thermosetting layer provides a heat sealable band on each of said labels.

9. A device for producing a label with a band of thermosetting adhesive material on one side thereof for subsequent heat sealing of said label onto an article, said device comprising:
(a) means for moving a strip of label stock along a given feedline, said strip having an exposed mounting surface;
(b) means for moving, along said feedline and over said mounting surface, an adhesive strip comprising a thermosetting layer having a first and second surface, said first surface facing and coextensive with said mounting surface, and a releasable backing strip over said second surface;
(c) a parting member on the same side of said feedline as said releasable backing strip;
(d) means for pulling said backing strip around said member and from said thermosetting layer;
(e) means for pressing said thermosetting layer against said strip of label stock whereby said layer is secured to said stock;
(f) means for cutting said strip of label stock and said thermosetting layer at selected intervals to form labels wherein said thermosetting layer provides a heat sealable band on each of said labels; and,
(g) means for sensing the length of the strip of label stock passing from said pressing means and means for actuating said cutting means in accordance with the sensed length.

10. A device for producing a label with a band of thermosetting adhesive material on one side thereof for subsequent heat sealing of said label onto an article, said device comprising:
(a) means for continuously moving, at a preselected speed and along a feedline, a strip of label stock onto which is secured an adhesive strip including a thermosetting layer adhered to said strip of label stock and a releasable backing strip on the side of said adhesive strip opposite to said label stock;
(b) means for continuously pulling said backing strip from said adhesive layer at a speed approximately equal to said preselected speed, said pulling means comprising a parting member overlying said backing strip and a pair of driven rolls spaced from said feedline and forming a nip through which said backing strip is pulled after it passes over said parting member;
(c) means for maintaining said layer with said strip of label stock as it moves along said feedline;
(d) means for cutting individual labels from said strip of label stock as said strip moves along said feedline.

11. A device as defined in claim 10 wherein said parting member is a roller.

12. A device as defined in claim 10 wherein said maintaining means is a stripper member overlying said layer and said stripper member being spaced from said pulling means in the direction of movement of said strip of label stock.

13. A device as defined in claim 12 wherein said pulling means includes a roller overlying said feedline and around which said backing strip passes, said roller having an axis and a radius X and said stripper being spaced from said roll axis in the direction of movement of said strip of label stock a distance approximately equal to X.

14. A device as defined in claim 12 wherein said stripper member includes a lower surface overlying said layer and said strip of label stock and an edge surface facing said pulling means, said lower surface being at least only slightly spaced from said layer.

15. A device as defined in claim 14 wherein said lower surface is coated with a non-stick material.

16. A device as defined in claim 14 wherein said edge surface is coated with a non-stick material.

17. A device as defined in claim 10 wherein said maintaining means includes a member biased against said layer down stream of said pulling means.

18. A device as defined in claim 17 wherein said biased member is a roller bearing against said layer.

19. A device as defined in claim 18 wherein said roller is forced against said layer by gravity.

20. A device for applying a label onto an article, said device comprising:
(a) means for moving at a preselected speed along a feedline a strip of label stock onto which is adhered an adhesive strip including a thermosetting layer adhered to said strip of label stock and a releasable backing strip on the side of said adhesive strip opposite to said label stock;
(b) means for pulling said backing strip from said adhesive layer at a speed approximately equal to said preselected speed;
(c) means for maintaining said layer with said strip of label stock as it moves along said feedline;
(d) means for cutting said strip of label stock and said layer into individual labels;
(e) a pair of clamping members, at least one of said members being heated to the heat sealing temperature of said thermosetting layer;
(f) means for feeding said article between said members with a selected portion of said article between said members;
(g) means for conveying one of said individual labels between said members with said layer facing said selected portion; and,
(h) means for forcing said members together whereby said thermosetting layer is sealed between said label stock and said article.

References Cited

UNITED STATES PATENTS

| | | | |
|---|---|---|---|
| 2,656,063 | 10/1953 | Kafka | 156—384 |
| 3,024,155 | 3/1962 | Huber | 156—247 |
| 3,291,675 | 12/1966 | Orloff et al. | 156—277 |
| 3,434,902 | 3/1969 | Bliss | 156—249 |
| 3,450,590 | 6/1969 | LaMers | 156—540 |

REUBEN EPSTEIN, Primary Examiner

U.S. Cl. X.R.

156—249, 510; 206—46